US010985818B2

(12) United States Patent
Karjalainen et al.

(10) Patent No.: US 10,985,818 B2
(45) Date of Patent: Apr. 20, 2021

(54) METHOD, SYSTEM AND APPARATUS

(71) Applicant: NOKIA SOLUTIONS AND NETWORKS OY, Espoo (FI)

(72) Inventors: Juha Pekka Karjalainen, Oulu (FI); Mihai Enescu, Espoo (FI); Sami-Jukka Hakola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/300,059

(22) PCT Filed: May 11, 2017

(86) PCT No.: PCT/EP2017/061243
§ 371 (c)(1),
(2) Date: Nov. 9, 2018

(87) PCT Pub. No.: WO2017/194643
PCT Pub. Date: Nov. 16, 2017

(65) Prior Publication Data
US 2019/0181935 A1 Jun. 13, 2019

(30) Foreign Application Priority Data
May 11, 2016 (GB) ..................................... 1608270

(51) Int. Cl.
*H04B 7/06* (2006.01)
*H01Q 3/24* (2006.01)
*H04B 7/08* (2006.01)

(52) U.S. Cl.
CPC ............ *H04B 7/0617* (2013.01); *H01Q 3/24* (2013.01); *H04B 7/0604* (2013.01);
(Continued)

(58) Field of Classification Search
CPC combination set(s) only.
See application file for complete search history.

(56) References Cited

U.S. PATENT DOCUMENTS

2010/0046650 A1* 2/2010 Jongren ............... H04B 7/0469 375/260
2010/0159845 A1* 6/2010 Kaaja .................... H04B 7/088 455/70

(Continued)

FOREIGN PATENT DOCUMENTS

| | | | |
|---|---|---|---|
| CN | 105453629 | A | 3/2016 |
| EP | 2387162 | A2 | 11/2011 |
| WO | 2018020078 | A1 | 2/2018 |

OTHER PUBLICATIONS

International Search Report and Written Opinion for International Application No. PCT/EP2017/061243, dated Aug. 18, 2017 (14 pages).

(Continued)

*Primary Examiner* — Junpeng Chen
(74) *Attorney, Agent, or Firm* — Brake Hughes Bellermann LLP

(57) ABSTRACT

A method comprises receiving beam cluster information from a beam forming access point. The beam cluster information defining a plurality of beam clusters. The beam cluster information defines beam identification information for each of a plurality of beams in a respective beam cluster. The beam cluster information is used to control the processing of at least one beam received from the access point.

18 Claims, 12 Drawing Sheets

(52) U.S. Cl.
CPC ......... *H04B 7/0689* (2013.01); *H04B 7/0695* (2013.01); *H04B 7/088* (2013.01)

(56) References Cited

U.S. PATENT DOCUMENTS

| | | | | |
|---|---|---|---|---|
| 2010/0273499 | A1 | 10/2010 | Van Rensburg et al. | |
| 2012/0113897 | A1 * | 5/2012 | Thiele | H04B 7/024 370/328 |
| 2013/0051364 | A1 | 2/2013 | Seol et al. | |
| 2013/0163544 | A1 | 6/2013 | Lee et al. | |
| 2013/0223251 | A1 | 8/2013 | Li et al. | |
| 2014/0198681 | A1 | 7/2014 | Jung et al. | |
| 2015/0372737 | A1 | 12/2015 | Park et al. | |
| 2016/0006122 | A1 | 1/2016 | Seol et al. | |
| 2017/0331544 | A1 * | 11/2017 | Athley | H04B 7/0695 |
| 2018/0006700 | A1 * | 1/2018 | Frenne | H04B 7/0626 |
| 2019/0097712 | A1 * | 3/2019 | Singh | H04B 7/08 |

OTHER PUBLICATIONS

Office Action for European Application No. 17726847.1, dated Jul. 22, 2020, 11 pages.
3GPP TSG-RAN WG1 #84bix, R1-162895; "Support for Beam Based Common Control Plane in 5G New Radio"; Busan, Korea; Apr. 11-15, 2016; 4 pages.
Office Action for United Kingdom Patent Application No. GB1608270.3, dated Dec. 29, 2020, 4 pages.

* cited by examiner

METHOD, SYSTEM AND APPARATUS

CROSS-REFERENCE TO RELATED APPLICATIONS

This application is a national stage entry of PCT Application No. PCT/EP2017/061243 filed May 11, 2017, entitled "METHOD, SYSTEM AND APPARATUS" which claims the benefit of priority of GB 1608270.3, filed May 11, 2016, both of which are hereby incorporated by reference in their entireties.

FIELD

Some embodiments relate to a method, system and apparatus in a scenario where beam forming of transmission and/or receiving beams is used.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. Another example communication system is so called 5G radio access technology.

Where beam forming is used for communication between an access point and a user equipment, the amount of system overhead relating to training, beam tracking and beam switching may be relatively high.

SUMMARY

According to an aspect there is provided a method comprising: receiving beam cluster information from a beam forming access point, said beam cluster information defining a plurality of beam clusters, said beam cluster information defining beam identification information for each of a plurality of beams in a respective beam cluster; and using said beam cluster information to control the processing of at least one beam received from said access point.

The method may comprise determining receive processing information associated with at least one beam received from said access point to control receive processing of another beam of a beam cluster to which the at least one beam belongs.

This may control the initial receive processing.

Each cluster of beams transmitted by said access point may be associated with a set of antenna ports, wherein said receive processing information comprises respective antenna port information.

The determining said receive processing information may comprise training a receiving beamformer.

The method may comprise receiving a plurality of replicas of one or more beams of a cluster, and using said plurality of replicas to train said beamformer.

The method may comprise receiving a plurality of reference beams from said access point.

Each reference beam may comprise beam identity information.

The plurality of reference beams may be received in one or more sweep blocks.

The cluster information may comprise one or more of: clustered downlink beams; association to a set of one or more antenna ports; cluster size; periodicity of cluster; information associated with a next available subframe.

The method may comprise receiving said cluster information in a broadcast channel.

The method may comprise receiving said cluster information in a system information block The method may comprise receiving said cluster information one of periodically or aperiodically.

The beam clusters may be configured dynamically or semi-statically.

The method may comprise receiving beam map information from said access point for beams provided by said access point.

The beam map information may comprise a codebook definition.

The method may comprise sending a request to said access point, said request requesting activation of one or more beams.

The request to said access point may be determined in dependence on beam cluster information and said beam map information.

A first beam may be received on one symbol of a subframe and at least one other beam of said cluster may be received on a different symbol of said subframe.

The method may be performed by an apparatus. The apparatus may be provided in a communication device.

According to an aspect, there is provided a method comprising: receiving a first beam from a beam forming access point; determining receive processing information for said first beam and to which of a plurality of beam clusters said first beam belongs; and using said receive processing information to control receive processing of another beam of the beam cluster to which the first beam belongs.

The method may be performed by an apparatus. The apparatus may be provided in a communication device.

According to another aspect there is provided an apparatus comprising: means for receiving beam cluster information from a beam forming access point, said beam cluster information defining a plurality of beam clusters, said beam cluster information defining beam identification information for each of a plurality of beams in a respective beam cluster; and means for using said beam cluster information to control the processing of at least one beam received from said access point.

The method may comprise means for determining receive processing information associated with at least one beam received from said access point to control receive processing of another beam of a beam cluster to which the at least one beam belongs.

This may control the initial receive processing.

Each cluster of beams transmitted by said access point may be associated with a set of antenna ports, wherein said receive processing information comprises respective antenna port information.

The means for determining said receive processing information may be for training a receiving beamformer.

The receiving means may be for receiving a plurality of replicas of one or more beams of a cluster, and using said plurality of replicas to train said beamformer.

The receiving means may be for receiving a plurality of reference beams from said access point.

Each reference beam may comprise beam identity information.

The plurality of reference beams may be received in one or more sweep blocks.

The cluster information may comprise one or more of: clustered downlink beams; association to a set of one or more antenna ports; cluster size; periodicity of cluster; information associated with a next available subframe.

The receiving means may be for receiving said cluster information in a broadcast channel.

The receiving means may be for receiving said cluster information in a system information block The receiving means may be for receiving said cluster information one of periodically or aperiodically.

The beam clusters may be configured dynamically or semi-statically.

The receiving means may be for receiving beam map information from said access point for beams provided by said access point.

The beam map information may comprise a codebook definition.

The apparatus may comprise means for sending a request to said access point, said request requesting activation of one or more beams.

The apparatus may comprise means for determining said request to said access point in dependence on beam cluster information and said beam map information.

A first beam may be received on one symbol of a subframe and at least one other beam of said cluster may be received on a different symbol of said subframe.

The apparatus may be provided in a communication device.

According to another aspect, there is provided an apparatus comprising: means for receiving a first beam from a beam forming access point; means for determining receive processing information for said first beam and to which of a plurality of beam clusters said first beam belongs; and means for using said receive processing information to control receive processing of another beam of the beam cluster to which the first beam belongs.

The apparatus may be provided in a communication device.

According to another aspect, there is provided an apparatus comprising at least one processor, and at least one memory including computer program code, the at least one memory and the computer program code configured to, with the at least one processor, cause the apparatus at least to: receive beam cluster information from a beam forming access point, said beam cluster information defining a plurality of beam clusters, said beam cluster information defining beam identification information for each of a plurality of beams in a respective beam cluster; and use said beam cluster information to control the processing of at least one beam received from said access point.

The at least one memory and the computer program code may be configured to, with the at least one processor, cause determining of receive processing information associated with at least one beam received from said access point to control receive processing of another beam of a beam cluster to which the at least one beam belongs.

This may control the initial receive processing.

Each cluster of beams transmitted by said access point may be associated with a set of antenna ports, wherein said receive processing information comprises respective antenna port information.

The at least one memory and the computer program code may be configured to, with the at least one processor, cause the apparatus to train a receiving beamformer.

The at least one memory and the computer program code may be configured to, with the at least one processor, cause the apparatus to receive a plurality of replicas of said first beam, and using said plurality of replicas to train said beamformer.

The at least one memory and the computer program code may be configured to, with the at least one processor, cause the apparatus to receive a plurality of reference beams from said access point.

Each reference beam may comprise beam identity information.

The plurality of reference beams may be received in one or more sweep blocks.

The cluster information may comprise one or more of: clustered downlink beams; association to a set of one or more antenna ports; cluster size; periodicity of cluster; information associated with a next available subframe.

The at least one memory and the computer program code may be configured to, with the at least one processor, cause the apparatus to receive said cluster information in a broadcast channel.

The at least one memory and the computer program code may be configured to, with the at least one processor, cause the apparatus to receive said cluster information in a system information block The at least one memory and the computer program code may be configured to, with the at least one processor, cause the apparatus to receive said cluster information one of periodically or aperiodically.

The beam clusters may be configured dynamically or semi-statically.

The at least one memory and the computer program code may be configured to, with the at least one processor, cause the apparatus to receive beam map information from said access point for beams provided by said access point.

The beam map information may comprise a codebook definition.

The at least one memory and the computer program code may be configured to, with the at least one processor, cause the apparatus to send a request to said access point, said request requesting activation of one or more beams.

The request to said access point may be determined in dependence on beam cluster information and said beam map information.

A first beam may be received on one symbol of a subframe and at least one other beam of said cluster may be received on a different symbol of said subframe.

The apparatus may be provided in a communication device.

According to another aspect, there is provided an apparatus comprising at least one processor; and at least one memory including computer program code; the at least one memory and the computer program code configured to, with the at least one processor, cause the apparatus at least to: receive a first beam from a beam forming access point; determine receive processing information for said first beam and to which of a plurality of beam clusters said first beam belongs; and use said receive processing information to control receive processing of another beam of the beam cluster to which the first beam belongs.

The apparatus may be provided in a communication device.

According to another aspect, there is provided a method comprising: causing beam cluster information to be transmitted from a beam forming access point, said beam cluster information defining a plurality of beam clusters, said beam cluster information defining beam identification information for each of a plurality of beams in a respective beam cluster; and causing at least one beam to be transmitted from said beam forming access point with respective beam identification information.

The method may comprise causing a plurality of replicas of said one or more beams of a cluster to be transmitted.

At least one beam may be caused to be transmitted in one or more sweep blocks.

The cluster information may comprise one or more of: clustered downlink beams; association to a set of one or more antenna ports; cluster size; periodicity of cluster; information associated with a next available subframe.

The method may comprise causing said cluster information to be transmitted in a broadcast channel.

The method may comprise causing beam map information to be transmitted from said access point for beams provided by said access point.

The beam map information may comprise a codebook definition.

The method may be performed by an apparatus. The apparatus may be provided in an access point.

According to another aspect, there is provided an apparatus comprising at least one processor, and at least one memory including computer program code, the at least one memory and the computer program code configured to, with the at least one processor, cause the apparatus at least to: cause beam cluster information to be transmitted from a beam forming access point, said beam cluster information defining a plurality of beam clusters, said beam cluster information defining beam identification information for each of a plurality of beams in a respective beam cluster; and cause at least one beam to be transmitted from said beam forming access point with respective beam identification information.

The at least one memory and the computer program code may be configured to, with the at least one processor, cause a plurality of replicas of said one or more beams of a cluster to be transmitted.

At least one beam may be caused to be transmitted in one or more sweep blocks.

The cluster information may comprise one or more of: clustered downlink beams; association to a set of one or more antenna ports; cluster size; periodicity of cluster; information associated with a next available subframe.

The at least one memory and the computer program code may be configured to, with the at least one processor, cause said cluster information to be transmitted in a broadcast channel.

The at least one memory and the computer program code may be configured to, with the at least one processor, cause beam map information to be transmitted from said access point for beams provided by said access point.

The beam map information may comprise a codebook definition.

The apparatus may be provided in an access point such as a base station.

According to another aspect, there is provided an apparatus comprising: means for causing beam cluster information to be transmitted from a beam forming access point, said beam cluster information defining a plurality of beam clusters, said beam cluster information defining beam identification information for each of a plurality of beams in a respective beam cluster; and means for causing at least one beam to be transmitted from said beam forming access point with respective beam identification information.

The apparatus may comprise means for causing a plurality of replicas of said one or more beams of a cluster to be transmitted.

At least one beam may be caused to be transmitted in one or more sweep blocks.

The cluster information may comprise one or more of: clustered downlink beams; association to a set of one or more antenna ports; cluster size; periodicity of cluster; information associated with a next available subframe.

The apparatus may comprise means for causing said cluster information to be transmitted in a broadcast channel.

The apparatus may comprise means for beam map information to be transmitted from said access point for beams provided by said access point.

The beam map information may comprise a codebook definition.

Various causing means are provided in various embodiments. These causing means may be provided by the same and/or different means. The apparatus may be provided in an access point such as a base station.

A computer program comprising program code means adapted to perform the method(s) may also be provided. The computer program may be stored and/or otherwise embodied by means of a carrier medium. The computer program may be provided on a non transitory computer program carrying medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain exemplifying embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 2 to assist in understanding the technology underlying the described examples.

A communication device 10 or terminal can be provided wireless access via base stations or similar wireless transmitter and/or receiver nodes providing access points of a radio access system.

Each of the access points may provide at least one antenna beam directed in the direction of the communication device 10 at a given time. In some embodiments a plurality of beams may be directed at a communication device. The antenna beam can be provided by appropriate elements of antenna arrays of the access points. For example, access links between the access points (AP) and a user equipment (UE) can be provided by active antenna arrays. Such arrays can dynamically form and steer narrow transmission/reception beams and thus serve UEs and track their positions. This is known as user equipment-specific beamforming. The active antenna arrays can be used both at the access point and at the user equipment device to further enhance the beamforming potential. More than one beam can be provided by each access point and/or antenna array.

Figure 1:
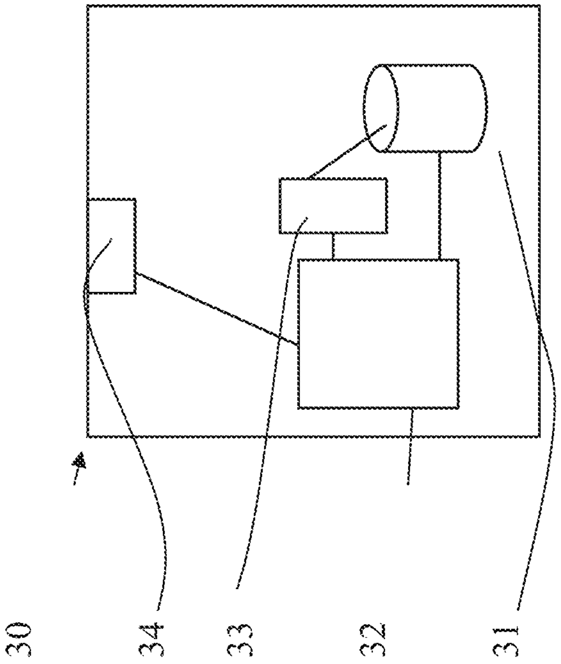
FIG. 1 shows a schematic diagram of a control apparatus according to some embodiments.

Access points and hence communications there through are typically controlled by at least one appropriate controller apparatus so as to enable operation thereof and management of mobile communication devices in communication therewith. FIG. 1 shows an example of a control apparatus for a node, for example to be integrated with, coupled to and/or otherwise for controlling any of the access points. The control apparatus 30 can be arranged to provide control on communications via antenna beams by the access points and on operations such as handovers between the access points. For this purpose the control apparatus comprises at least one memory 31, at least one data processing unit 32, 33 and an input/output interface 34. Via the interface the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via fixed line connection and/or radio interface. The logical connection between the base station nodes can be provided for example by an X2 interface. This interface can be used for example for coordination of operation of the stations.

The communication device or user equipment (UE) 10 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards, machine type devices or any combinations of these or the like.

Figure 2:
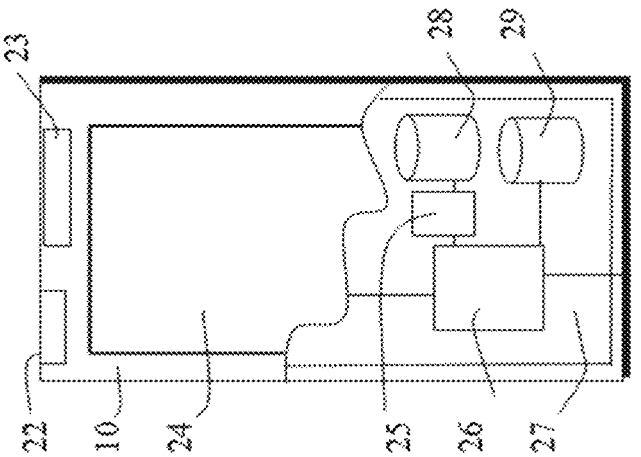
FIG. 2 shows a schematic presentation of a possible communication device.

FIG. 2 shows a schematic, partially sectioned view of a possible communication device. More particularly, a handheld or otherwise mobile communication device (or user equipment UE) 10 is shown. A mobile communication device is provided with wireless communication capabilities and appropriate electronic control apparatus for enabling operation thereof. Thus the communication device 10 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the communication device are configured to cause control and signalling operations in accordance with certain embodiments of the present invention as described later in this description. A user may control the operation of the communication device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The communication device may communicate wirelessly via appropriate apparatus for receiving and transmitting signals. FIG. 2 shows schematically a radio block 23 connected to the control apparatus of the device. The radio block can comprise a radio part and associated antenna arrangement. The antenna arrangement may be arranged internally or externally to the communication device. The antenna arrangement may comprise elements capable of beamforming operations.

Some embodiments relate to mobile communication networks with beamforming techniques. For example, 5G radio access technology and LTE-A (Long term evolution-advanced) evolution have proposed using beamforming techniques. It should be appreciated that other embodiments may be used with any other communication system which uses beamforming. For example some wireless area networks may use beamforming.

The 5G radio system may use frequencies form 400 MHz to 100 GHz. Beamforming is considered to be desirable in enabling the use of the higher frequency bands due to coverage issues. It should be appreciated, that other embodiments may use different frequency ranges.

Some transceivers (e.g. a hybrid transceiver architecture) may use analogue beamforming, which may mean a large amount of narrow beams as this is dependent on the number of antenna elements and carrier frequency. It should be appreciated that other embodiments may be used with digital beamforming transceiver architecture or so-called hybrid transceiver architecture which use a hybrid of digital baseband processing (such as MIMO Multiple Input Multiple Output, and/or digital precoding) and analogue beamforming. It should be appreciated that embodiments can be used with any method of beamforming.

Figure 3:
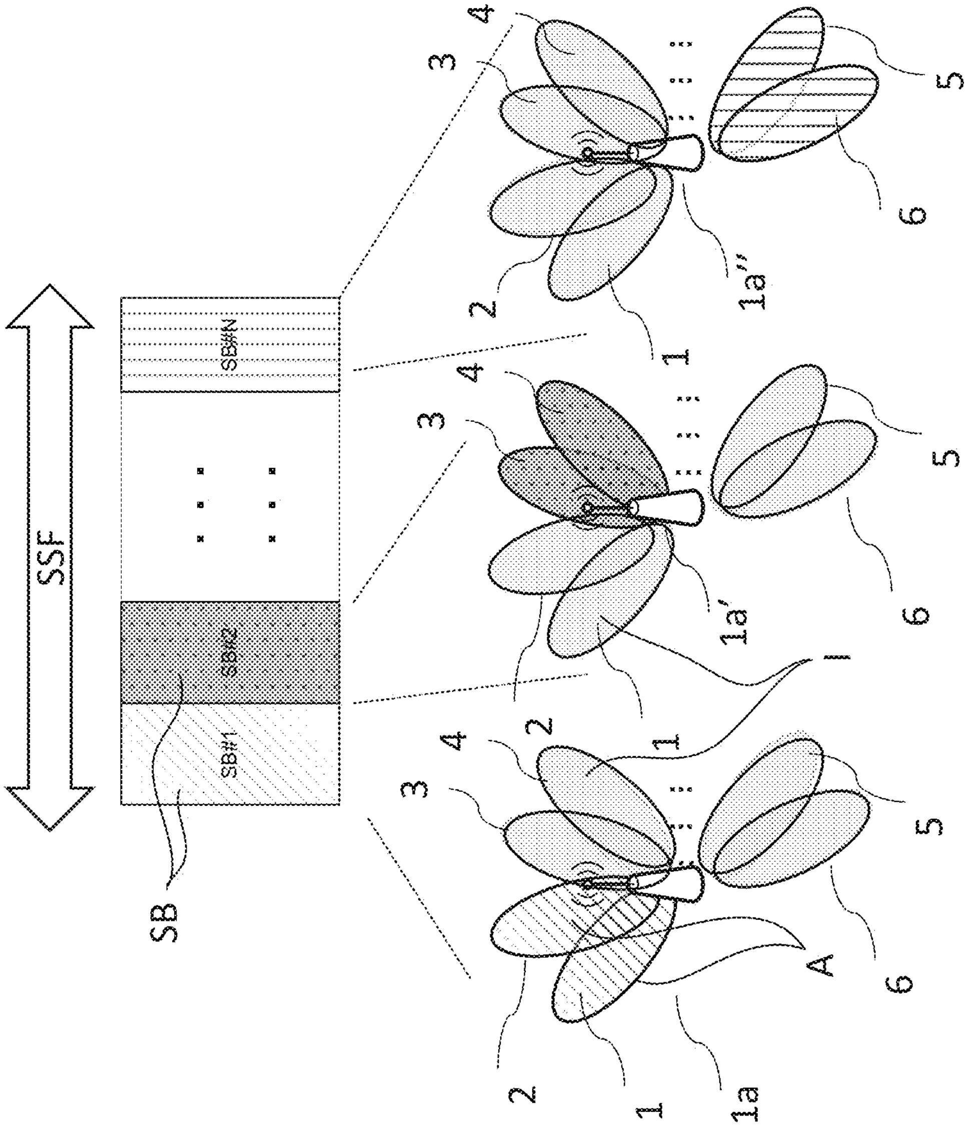
FIG. 3 shows a schematic diagram of a sweeping subframe.

Reference is made to FIG. 3 which shows an access points configured with a sweeping sub-frame The access point is shown changing the beams in time, at a first point in time it is denoted as 1*a*, at a second point in time as 1*a*' and at a third point in time as 1*a*". The access point may be a base station. In some standards, such as 5G, the access point may be referred to as a BS (Base station). A cell coverage area is covered by beams transmitted by the access node. In the example shown in FIG. 3, six beams are shown for the access point. These are beam 1, beam 2, beam 3, beam 4, beam 5, and beam 6. At each time instance, the access point has two active beams in a sweeping block (SB) Consecutive sweeping blocks are transmitted by the base station, each sweeping block consisting of different beams compared to other sweeping blocks. Beam 1 and beam 2 are active at first time instance in the sweeping block 1, beam 3 and beam 4 are active for the second sweeping block 2, and beam 5 and beam 6 are active for the Nth sweeping block N. During a sweeping block, only some of the beams are active, the rest of the beams are inactive. It should be appreciated that in different embodiments, more or less than six beams may be provided.

There are N sweeping blocks where N is an integer. There may be M beams per block where M is an integer. M and/or N may in some embodiments be 2 or more.

In some embodiments the number of active and inactive beams provided may also vary over time. The number of active beams may vary between the access points.

To enable system access, periodical transmission of system information may be required per direction where one or more beams cover a specific area of a cell. The corresponding directions may need to be covered to provide resources for system access. When an access point covers a specific area with a set of beams during a time interval (such as symbol duration or two symbol durations) it is called a sweep block. FIG. 3 illustrates the concept of sweep blocks: For sweep block SB #2 the beams 3 and 4 are active and for sweep block SB #N the beams 5 and 6 are active. Although FIG. 3 illustrates that adjacent beams are active during sweep block it should be understood that a different set of beams may be selected for a given sweep block. Active beams are referenced A in FIG. 3 and inactive beams are referenced I.

FIG. 3 further depicts a sweeping sub-frame SSF. The sweeping sub-frame may provide coverage for common control channel signaling with beamforming. The sweeping sub-frame consists of sweeping blocks SB.

The total number of beams required to cover the required cell area may be larger than the number of concurrent active beams that the access point is able to form. Therefore access points need to sweep through the cell coverage area in the time domain by activating a different set of beams on each sweep block. Depending on the number of active beams per sweep block and on the total number of beams required to cover a cell area, two or more sweep blocks may be required. Furthermore, the number of sweep blocks per sub-frame is limited by the length of each sweep. As an example, one sweep block duration may be one or two symbols (for example, OFDM (orthogonal frequency-division multiplexing) symbols) and if there are 14 symbols per sub-frame, the sweeping sub-frame would be able to accommodate 7 or 14 sweep blocks. Depending on the number of sweep blocks required to cover a cell, a plurality of sweeping sub-frames may be needed. However, this is by way of example only and different configurations may be used in different embodiments.

The active beams depicted in FIG. 3 may be used for either transmitting or receiving information. The sweeping sub-frame can therefore be defined as a downlink sweeping sub-frame, when the active beam is transmitting information, or as an uplink sweeping sub-frame, when the active beam is receiving information. Furthermore, assuming a TDD (time division duplex) system and reciprocity between downlink and uplink channels, to cover a cell area on the uplink and the downlink directions with the same beam configurations per sweep block, the same sweep blocks need to be defined on uplink and downlink direction.

As an example of downlink direction, if downlink common control channel coverage is provided by the sweeping sub-frame, each sweep block may carry cell access information such as one or more of downlink synchronization signals, system information such as MIB (master information block), SIB (system information block) or the like. Other examples or information which may be include alternatively or additionally comprise one or more of, PRACH/RACH (physical random access channel and random access channel configurations), paging, and any control information that needs to be broadcasted in a cell. In the uplink direction, the sweeping sub-frame/sub-frames may accommodate resources for the random access channel or other uplink channels requiring periodic availability such as SR (scheduling request).

A non-limiting definition for a beam is a detection of a beam specific reference signal (BRS). In one example, a beam specific reference signal BRS is mapped to an antenna port which maps to at least one, typically a plurality of, antenna elements. The signals leading to the antenna elements are individually weighted (depending on architecture this may be analogue or digital weighting), to form a specific radiation pattern.

Multiple antenna ports may be defined (thus multiple radiation patterns may be formed) which are identified by detection of different beam specific reference signals. These radiation patterns may be equally shaped but may point in different directions.

A single beam specific reference signal may be mapped to two or more antenna ports which may or may not map to the same antenna elements. In some embodiments, antenna elements can be mapped dynamically to different ports. One example is to transmit a beam specific reference signal using two antenna ports where the antenna element specific weights are equal, but the first antenna port maps to elements that are horizontally polarized (H-polarization) and second antenna port maps to elements which are vertically polarized (V-polarization). Thus the radiation patterns of the elements of the first and second ports are the same but as same beam specific reference signal is transmitted through both ports they are observed as a single beam. In some embodiments, a beam specific reference signal may be transmitted on two or more ports where the antenna element specific weighting is not equal (different radiation patterns).

In a beamformed system where the cell coverage is provided by multiple beams, it may be beneficial to identify a single beam e.g. by using beam specific reference signals enabling user equipment to perform beam level detection/separation and perform measurements on beam specific reference signal. The measurements may determine indicators such as, but limited to, one or more of Reference Signal Received Power (RSRP), Reference Signal Received Quality (RSRQ), received signal strength indicator (RSSI)), channel quality indicator (CQI) or the like. Identifying different beams may be beneficial e.g. when user equipment indicates to the network access point the preferred communication beam during initial access or mapping a measurement to a common reference index when reporting the measurements to the network access point.

To identify a beam, the following mappings can be made: e.g. if eight different beam reference signals are transmitted per sweep block, the receiver is potentially able to measure eight different signal indices (beams or beam indices). The eight different BRS signals are corresponding to eight antenna ports. The same beam specific reference signal antenna ports may be reused in the next sweep block, thus the sweep block ID may need to be determined to be able to determine the beam index. Thus the beam index may be calculated by:

Beam index=BRS antenna port*Sweep block index

The sweep block index may be explicitly signalled if the sweep block (sweep symbol or multiple symbols) convey also one or more of information such as MIB, SIB, DL CTRL (downlink control), DL DATA (downlink data) and/or the like. Alternatively or additionally, the sweep block may include a specific sequence number to identify the block.

To achieve sufficient coverage and capacity in a cellular network, propagation/path loss of the radio channel at high carrier frequencies, e.g. 28 GHz or similar frequencies, may be compensated by introducing directive transmission and reception in the form of beamforming, e.g. via large scale antenna arrays. As a result of this, relatively large antenna array gains, at both the access point, (e.g. 18 dB with 64 antenna elements) and the user equipment (e.g. 9 dB with 8 antenna elements) may be achieved to compensate propagation loss and/or losses for example due to rain and oxygen absorption. Different embodiments may of course operate at different carrier frequencies.

Some embodiments may use a carrier frequency of 28 GHz and a system bandwidth of 100 MHz. However, this is by way of example only and different carrier frequencies and/or bandwidths may be used in other embodiments.

Some embodiments may use a hybrid multi antenna deployment at the base station (BS). The UE may be able to perform analog/RF beamforming or any other suitable beamforming. Some embodiments may provide a signalling method to enable beam transmission and exploitation at the receiver.

To exploit the full merit of large scale antenna arrays, such as phased antenna array technology, directivity at transmitter and receiver need to be dynamically adjusted according to a deployment scenario and potential changes in a radio link between transmitter and receiver. In practice, especially in cellular networks with multiple access points and users, this may lead to excessive amount of system overheads related to beamformer training, beam tracking and beam switching at the user equipment and associated signalling needs between access point and user equipment (e.g. a beam report providing beam specific reference signal measurements or carrying CSI (channel state information).

Figure 4:
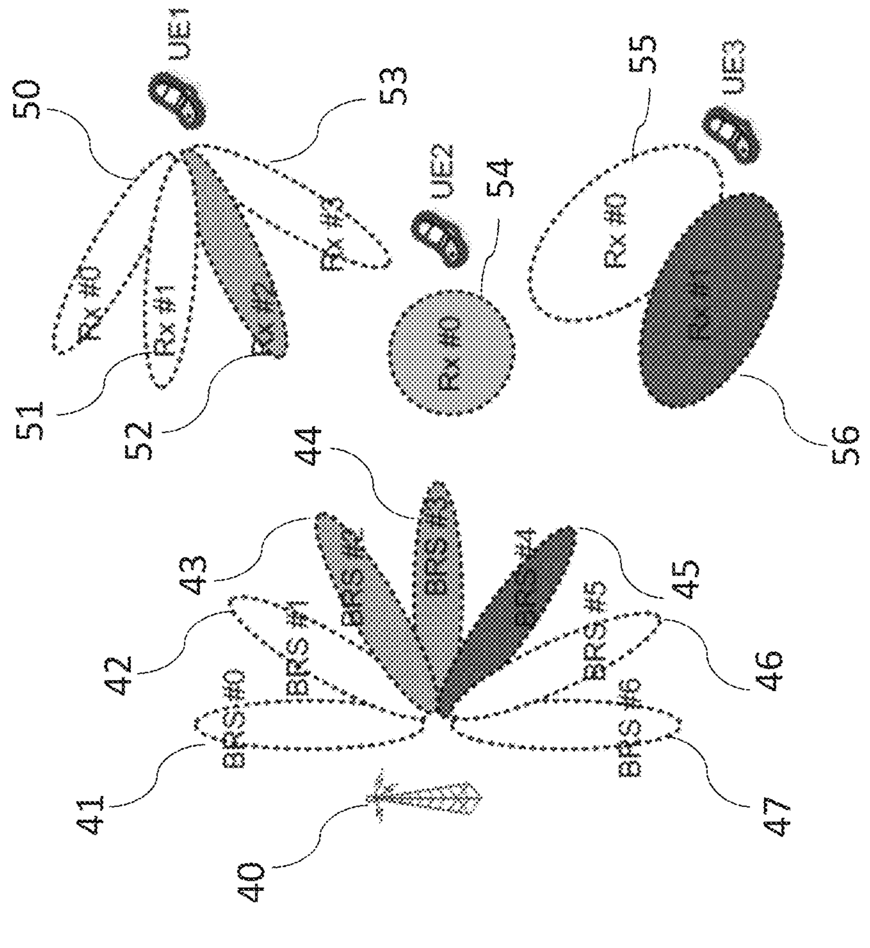
FIG. 4 shows a schematic diagram of a base station and three user equipment devices.

Reference is made to FIG. 4 which illustrates that both user equipment and network (access point) beamforming may be used. FIG. 4 shows an access point 40, and three user equipment devices UE1, UE2, UE3. The access point beams, 41-47, and user equipment beams 50-56 of UE1, UE2 and UE3 are also schematically illustrated. Each user equipment is shown to have a different receiving beam resolutions Rx by way of example.

As described above, access point coverage is provided by forming a set of beams that cover a part of the cell area, thus the user equipment may detect a plurality of beams as the radiation patterns of different beams typically overlap to provide solid coverage (FIG. 4 illustrates a simplified view).

Depending on the user equipment's communication beam direction, a different beam, or set of beams may be detected. In addition to this, the case of an omnidirectional beam should also be discussed. As a narrow beam illustrates higher antenna gain (obtained by using a plurality of elements, weighted accordingly to point the main lobe), the omnidirectional beam has equal antenna gain to all directions. Thus the user equipment is able to detect signals from all directions (also interference) but with lower antenna gain.

UE1 operates with four receiving beams 50-54 and matches receiving beam 52 with the access point transmitting beam 43, as illustrated by means of matching shading in FIG. 4.

UE2 is an omnidirectional user equipment for which the best downlink beam is access point beam 44.

UE3 is operating only two receiving beams, 55, 56, and matches beam 56 with the access point beam 45.

In some embodiments, to enable a communication device to perform efficient and relatively low complexity beamformer training for a receiver and/or transmitter, a network access point may provide assistance information on the characteristics of transmitted downlink beams as a part of a periodic downlink broadcasting subframe. This assistance information is cluster information.

Dynamic/semi-static signalling of clustering information may be provided in some embodiments.

This cluster information may be defined by the access point and/or by one or more network apparatus.

The clusters may be defined in any suitable manner. In some embodiments, regular patterns of clusters may be defined. In some embodiments, all the clusters may be of the same size. In some embodiments, different clusters may have different numbers of beams. The cluster shape may be regular or irregular.

Figure 9:
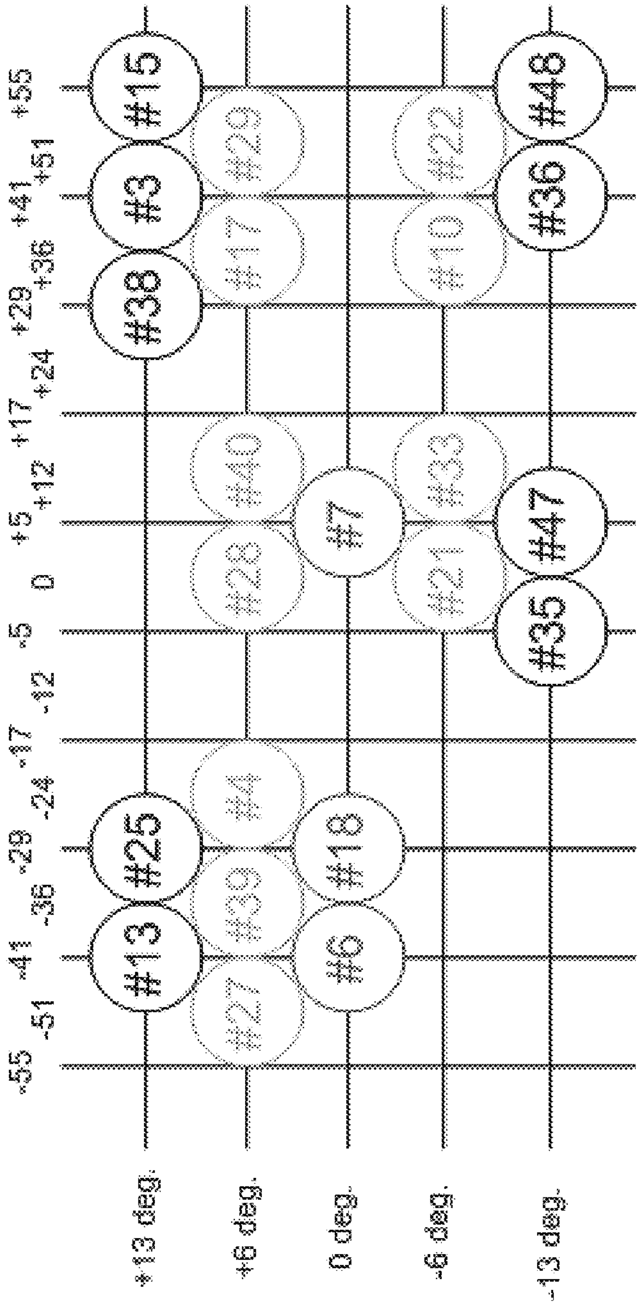
FIG. 9 shows a schematic view of beam group transmission.

In examples described later various different shapes and sizes of cluster are illustrated. For example, in FIG. 7, beams 1, 3, 7 are a cluster. FIG. 9 shows another example of clusters.

In some embodiments, the radio environment may be taken into account when defining the cluster size and/or shape and/or position.

Any suitable criteria may be used for defining the position and number of cluster beams. For example, one criteria may be spatial correlation between beams. This correlation could be higher or lower. Alternatively or additionally, spatial "proximity" may be taken into account. For example, neighbour beams may be in a cluster even if they are not highly correlated from a signal processing point of view.

The number of beams in a cluster may be preconfigured.

In some embodiments, the number of beams in a cluster may be dependent on the beam width. For example, for wider beams there may be fewer beams in a cluster as compared to narrower beams. By way of example only, if there are wide beams in the cell, then there might be a low number of beams in cluster, e.g. 3. If there are narrow beams in the cell, there may be more beams in the cluster, e.g. 5.

The clusters are defined by the access point. According, the cluster or clusters used by a user device will depend on its position in the cell. Two UEs next to each other might experience beams from same cluster.

In some embodiments, information about the all of the clusters associated with an access point are provided to a UE. In other embodiments, information about only a subset of the clusters are provided to a UE.

In some embodiments, the clustering information of a set of downlink transmit TX beams is associated with a set of antenna ports to be decodable/detectable by a communication device.

The clustered antenna ports may be provided in a downlink broadcasting sweeping subframe(s) (BRS—beam reference signal).

The clustered antenna ports may be are periodically or a periodically transmitted to a particular UE (BRRS—beam refinement reference signal).

DL beam clustering information may define spatial characteristics of downlink beams of broadcast sweep subframe distributed over single and/or a plurality of sweep subframes.

Clustering information may comprise one or more of: clustered downlink beams and their association to a set of antenna ports, cluster size, and periodicity of a cluster at symbol and/or subframe and/or radio frame level.

Clustering information may be provided explicitly into a master system information block MSIB and/or a secondary system information block SSIB.

Clustering information may alternatively or additionally be obtained implicitly from a symbol(s) in a sweeping subframe. The may be provided as a combination of one or more information from synchronization signals, initialization of sequences, and information from a broadcast channel.

Clustering information may be captured by a beam cluster index.

In one embodiment, a UE is informed of a beam map consisting of a full downlink beam arrangement in the DL.

In some embodiments, assistance information on the clustering of downlink TX beams associated with a set of TX antenna ports may be used at the communication device for its TX/RX beamformer training and/or related measurements at the communications device.

In some embodiments by leveraging beam clustering assistance information, RX beamformer weights, e.g. phase and/or amplitude, can be trained. This may improve reliability and/or reduce computational complexity.

By exploiting the clustering information provided by a network access point, a communication device can generate clustering of DL beams and use generated clustering for its RX and/or TX beamformer training.

In some embodiments, a communications device is able to trigger the transmission of reference signals RS on beams which were not active in a previous transmission.

Some embodiments may provide network assistance information for a communication device via broadcasting sweep subframe or dynamic/semi-static signalling to enhance the capability of the communication device to train its RX beamformer. By using assistance information, the communication device can have a priori information about the clustering of downlink beams. Therefore, the communication device may be able to perform more reliable and efficient training of a RX beamformer with respect to a situation without any a priori information.

Figure 6:
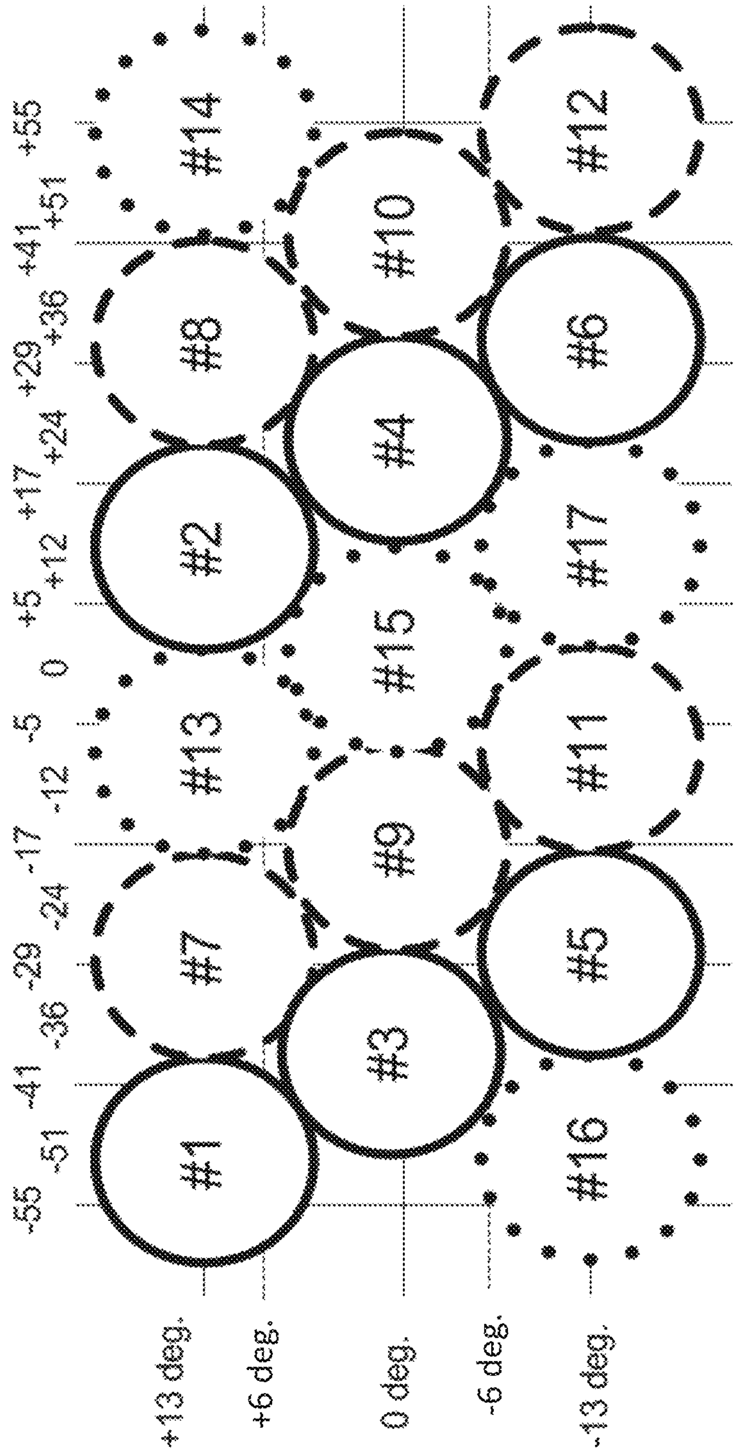
FIG. 6 shows a schematic view of a base station beam arrangement in a sweeping subframe.

Reference is made to FIG. 6 which shows a base station beam arrangement in the sweeping subframe. Different circle line types (continuous, dash, dot) are used to indicate beams which are transmitted in the same OFDM symbol. In the example of FIG. 6, beams #1, 2, 3, 4, 5, 6 are transmitted in one OFDM symbol, beams #7, 8, 9, 10, 11, 12 are transmitted in a different OFDM symbol, beams #13, 14, 15, 16, 17 are transmitted in yet another OFDM symbol. It can be seen that in one OFDM symbol the UE covers both azimuth and elevation dimensions. Beam clustering information would indicate to the UE beam neighbours for which the UE could utilize same (or close) receiver processing.

Figure 7:
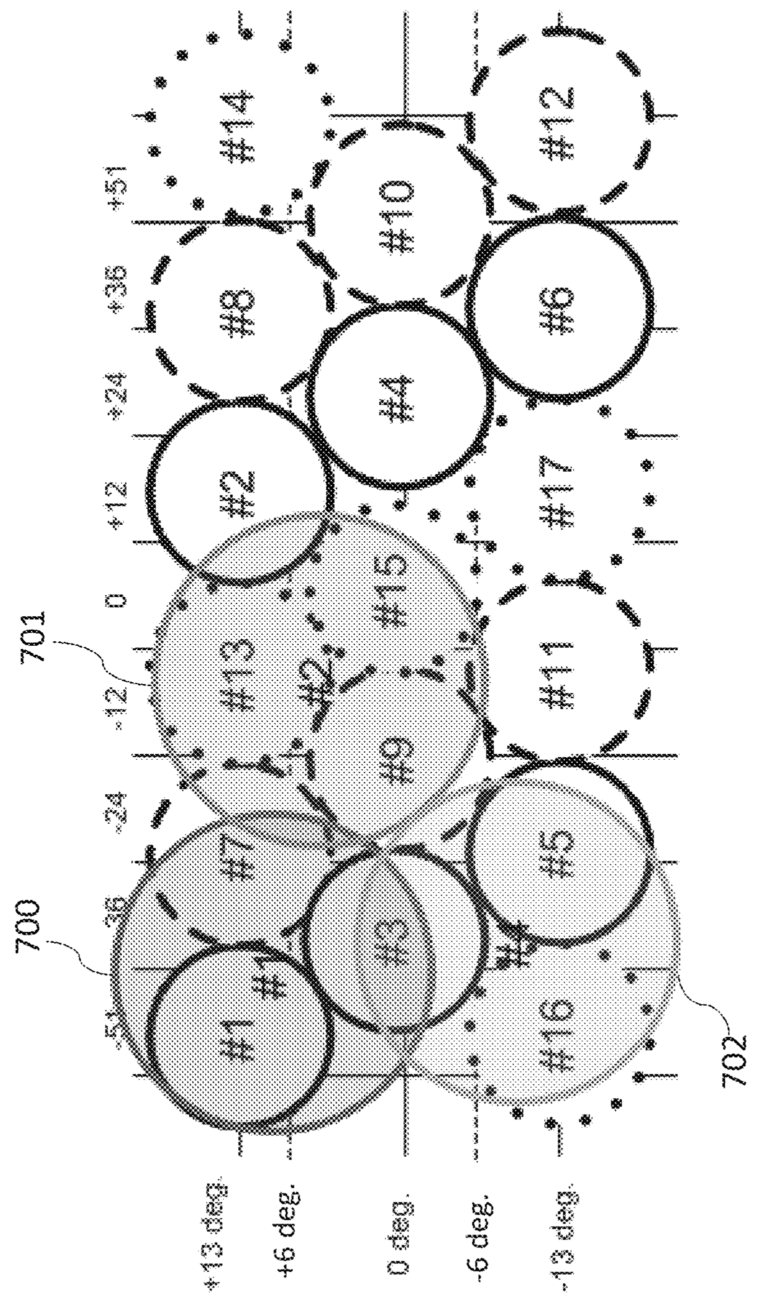
FIG. 7 shows a schematic view of a user device beamforming process for different downlink beams.

Reference is made to FIG. 7 which illustrates some example beam clustering. FIG. 7 shows a UE beamforming process for different DL beams. For example, in FIG. 7, beams #1, 7, 3 can be signalled as part of one spatial cluster which is referenced 700. This is associated with a first Rx filter #1. Beams #3, 5, 16 can be signalled as part of another spatial cluster which is referenced 702. This is associated with a Rx filter referenced #4. Beams #9, 13, and 15 can be signalled as part of another spatial cluster which is referenced 701. This is associated with a Rx filter referenced #2.

The UE could utilize same Rx beamforming processing, for a given cluster. The beams part of an indicated cluster can be regarded as having a spatial diversity smaller compared to beams not part of an indicated cluster. Take beams #1, 8 and 17 which are far apart, these beams would have a larger spatial diversity than the beams in any cluster. For different beam clusters the UE may use different Rx processing. This cluster information may assist in UE processing as follows: when the UE is processing beam #1, the UE derives UE beamforming Rx-1. Having the beam clustering information, when the UE is processing at a later stage beams from the same cluster but in different symbols, such as beam #7 or #3, the UE knows that Rx-1 is a first cluster to consider.

However, as shown in FIG. 7 alternative receiver assumptions need to be considered by the UE, for example beam #3 may be processed with UE beamforming filter Rx #1 associated with the first cluster 700 or the filter Rx-#4 associated with the cluster referenced 702, the UE would filter Rx #1 associated with the first cluster 700 as first alternative. Beam #3 can be also processed by the filter associated with the group referenced 702.

In FIG. 7, beams 1, 2, 3 . . . 6 are transmitted in first sweeping block. When UE is detecting beam #1 it is using a UE receiver Rx number 1. For each beam, the UE needs to test its receiver beams—this can be Rx1, Rx2, . . . Rx4 or up to RxN for example, hence the UE also does a form of beam sweeping on its Rx beams. After detecting beam #1 the UE moves to beam #2 where a different Rx receiver is used. However, when the UE moves to beam #3, it knows that it is part of cluster 700, and the UE also knows that for beam 1 it used Rx1, hence the beams in a cluster are likely to need the same Rx receiver at the UE. Knowing the cluster helps in that the UE does not need to test all of its Rx beams.

For a particular beam the UE is sweeping its Rx beams and for each Rx beams is computing a metric, for example RSRP. The Rx beams which give the highest RSRP is declared the "winner".

Figure 8:
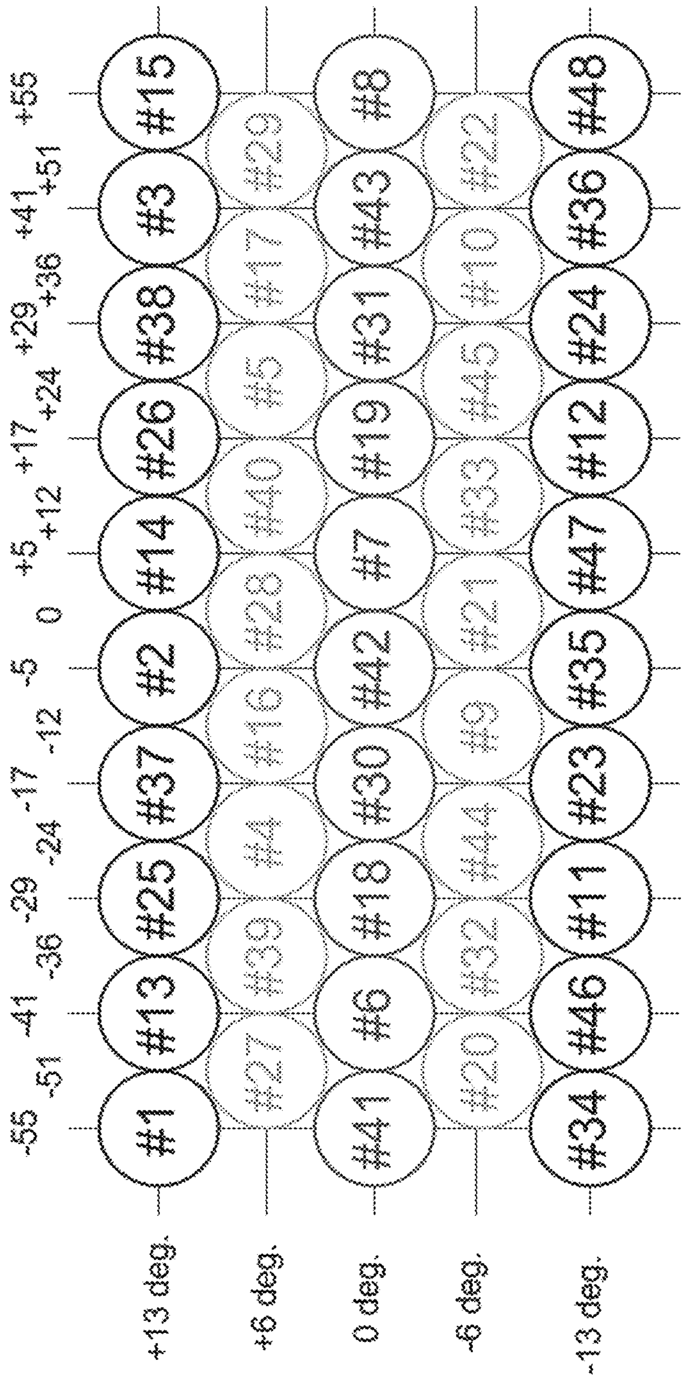
FIG. 8 shows a schematic view of a beam map arrangement at a transmitter.

Reference is made to FIG. 8 which shows, as an example, all possible beams which can be formed at the transmitter. This provides a "beam map". By creating clusters of beams and indicating this to the UE, the UE is able to recreate the beam map. In some embodiments, this may allow the UE to recreate the map even if not all the beams are transmitted and/or active in the downlink. It should be noted that the beam numbering used in FIG. 8 is different to that of FIGS. 6 and 7.

A beam map may be indicated to the UE by signalling the number of horizontal beam rows, the number of vertical beam columns, the shift in beam index between two adjacent beams on same row, if different amount of beams are in the odd and even rows. For example, in the case of the embodiment shown in FIG. 8, if the first beam index is 1, then the next is 13, so the BS signals have a modulo 12 as difference between two beams indices where the beams are adjacent in a given row. Thus in some embodiments, a definition may be provided to the UE which allows the UE to determine the map with the beam indices. In other embodiments, the information providing the beam map may take any suitable form. For example a "bit map" representation may be used to define the location of beam indices in a beam index map.

FIG. 9 shows the transmission of clusters of active beams. This may be performed in a UE specific manner. The indication of the clusters may be provided by dynamic or semi-static signalling. A first beam cluster shown in FIG. 9 is formed by beams #13, 25, 27, 39, 4, 6, 18. A second cluster is formed by beams #28, 40, 7, a third adjacent cluster is formed by beams #21, 33, 35, 47, a fourth cluster is formed by beams #38, 3, 15, 17, 29 and a fifth cluster is formed by beams #10, 22, 36 and 48. Such clusters can be enabled by means of a downlink beam specific RS such as a beam refinement RS, by signalling beam cluster information via a sweep subframe or in any other suitable manner.

As discussed previously, the UE is provided with information such that the UE has or is able to recreate the beam map shown in FIG. 8. If the transmitted beams are not sufficient, the UE could cause the triggering of the beams which are not active for that UE, hence in order to operate efficiently in the presence of mobility. This may be done by the UE sending a request or a trigger to the base station to cause these beam or beams to be activated for the UE.

Figure 10:
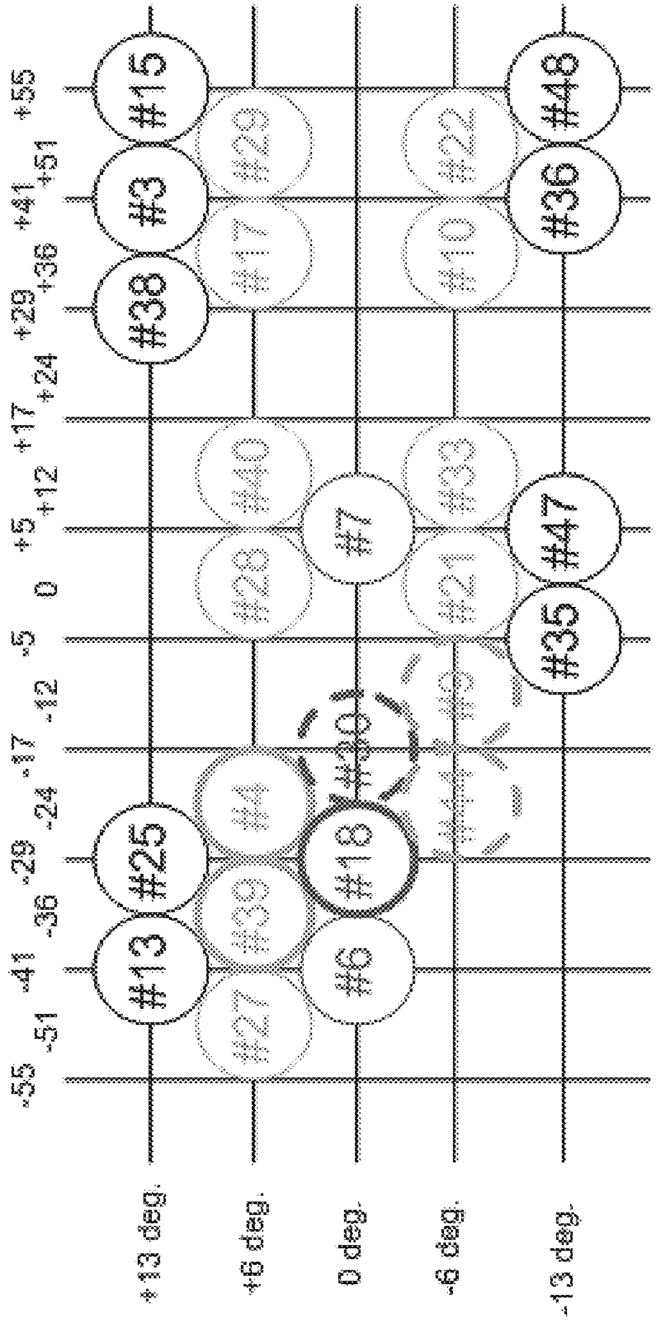
FIG. 10 shows a schematic view of a beam clustering request.

For example in FIG. 10, the beams #30, 44, 9 are shown in dashed lines which can be requested/triggered by the UE (these beams have not been active at a previous time, as shown in FIG. 9). This is possible as the UE knows the beam map.

By exploiting the reciprocity of channel, DL TX beams can be used as uplink RX beams at base station and DL RX beams at UE can be used as TX for uplink.

Some embodiments may minimize/avoid the usage of dedicated reference signal, e.g. BRRS, for beam training, tracking and switching purposes. As a result, the efficiency of a wireless systems, in terms of overhead and latency, may be improved.

Periodic clustering information of a set of downlink beams may be associated with a set of reference signal antenna ports e.g. BRS. The clustering information may be encoded explicitly as a part of broadcast channel, e.g. PBCH (physical broadcast channel) and/or SIB (system information block). These channels may be respectively referred to as xPBCH and xSIB in the proposed 5G system.

The periodic clustering information may include one or more of the following: antenna port specific clustering periodicity at subframe and/or symbol level; and the size of cluster per each antenna port associated with the set of antenna ports.

Aperiodic clustering information of downlink beams may be associated with a set of reference signal antenna ports e.g. BRS. Aperiodic clustering information may be encoded explicitly as a part of broadcast channel, e.g. PBCH (physical broadcast channel) and/or SIB (system information block). These channels may be respectively referred to as xPBCH and xSIB in the proposed 5G system. The aperiodic clustering information may include one or more of the following: next available subframe number for each antenna port associated with the set of antenna ports; and symbol number associated with next available subframe.

In some embodiments, a set of indices to a beam cluster codebook or beam map codebook may be encoded as a part of the broadcast channel, e.g. PBCH (physical broadcast channel) and/or SIB (system information block). The encoding may be explicit or implicit.

The cluster codebook may define a plurality of options for beam clustering or beam map. A beam cluster may have one or more of a sweep subframe duration; number of antenna ports, granularity of spatial sampling in azimuth and/or elevation domains, clustering periodicity, and the size of a cluster. Different options may have one or more of: different sweep subframe durations; different numbers of antenna ports, different granularity of spatial sampling in azimuth and/or elevation domains, different clustering periodicity, and different size of a cluster.

A cluster codebook/beam map can be constructed in any suitable way. For example the, 3GPP standard has a 3GPP 2D-codebook definition (assumes 2D DFT (discrete Fourier transform) beams) where a number of antenna ports and oversampling factor per azimuth and elevation are defined and cover a spanned 2D beam space.

By using a priori information (i.e. information known in advance) of clustered TX beams a communication device is enabled to have a plurality of copies/replicas of a transmitted signal arriving from nearly same directions associated with a cluster. As a result of this, a receiver has the opportunity to train/adjust its beamformer weights, e.g. amplitude and/phase to correspond intended direction.

Figure 13:
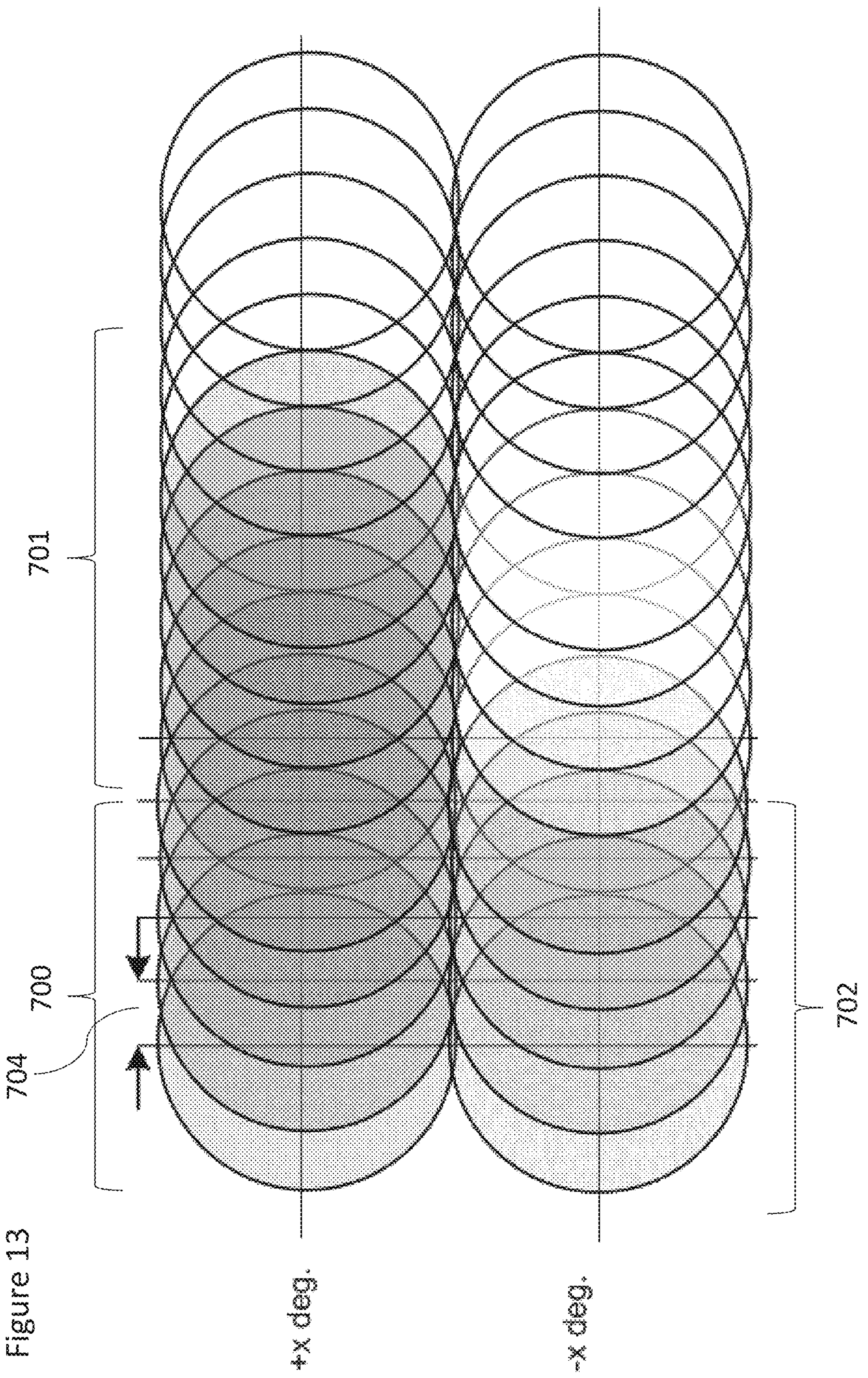
FIG. 13 shows a schematic view of a user device beamforming refinement process for different downlink beams.

In this regard, reference is made to FIG. 13. The BS sends a small burst of BRRS for each replica in the burst, and the UE is fine tuning its receiver. Replicas of the Rx beam are depicted by the overlapping circles, the beams associated with each of groups 700, 701 and 702 being illustrated. As can be seen, there are more replicas for each of the groups than the three beam of the group. The UE is trained by the reception of the replicas during the BRRS burst. Reference 704 shows the refinement resolution between the replica beams. On each successive replica, the UE is able to orient its beams better and better towards a particular direction.

Periodic clustering information of downlink beams may be associated with a set of reference signal antenna ports e.g. BRS.

The clustering information may be implicitly encoded as a part of values and parameterization of other signals and channels within a sweep subframe. This information may be antenna port specific clustering periodicity which may be at the subframe and/or symbol level and/or the size of cluster per each antenna port associated with the set of antenna ports.

Periodic/aperiodic clustering information of downlink beams may be associated with a set of UE specific reference symbols, e.g. BRRS.

The clustering information may be signalled dynamically or semi-statically.

The UE may be able to trigger beams which are not active, based on the reference symbols map and clustering information.

Figure 5:
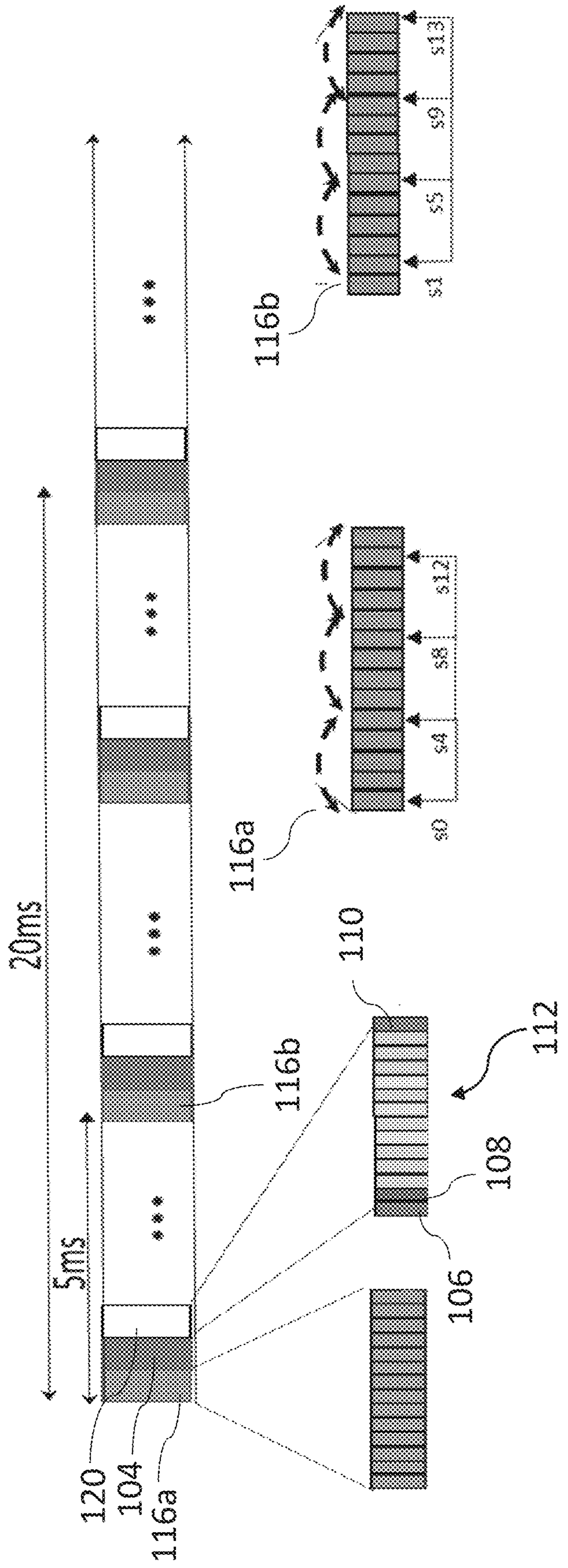
FIG. 5 shows a schematic diagram of an overview of frame structure.

FIG. 5 shows an example of DL beam cluster information association with a downlink broadcasting sweep subframe. In this particular example, beam clusters have the periodicity of four OFDM symbols in the first two subframes. With reference to FIG. 5, there is shown an overview of the frame structure and the positions of relevant downlink and uplink signals and channels. Each frame has a DL sweeping subframe 116 with 14 OFDM symbols; SSS (secondary synchronisation signal), PSS (primary synchronisation signal), ESS (enhanced system selection) BRS, PBCH (physical broadcast channel) being provided in each symbol. The downlink transmission beams DL TX are associated with RS reference signal, for example the BRS, antenna ports from which the RSRP or similar measurements for P different beam groups are computed.

FIG. 5 shows a first DL sweep frame 116*a* and the next DL sweep frame 116*b*. By way of example, symbols 0, 4, 8 and 12 are highlighted in one sub-frame and symbols 1, 5, 9 and 13 in the next. This shows how a cluster may have periodicity, e.g. every 4th symbol within a sub-frame (116*a* and 116*b*). This is by way of example only and in some embodiments the periodicity may be the same or different.

This is followed by a UL sweeping sub-frame 104. This is followed by a DL/UL sub-frame 120. This has a first field 106 for DL CTRL information, a second field 108 for DMRS information, and 11 fields 112 for UL data, DL data and CSI-RS/SRS (sound reference signal). The last field 110 is for UL CTRL information. Based on RSRP or similar measurements, the UE sends a periodic or aperiodic single joint beam group report covering P different groups or separately P different beam group reports via UL control. The frame may have a 5 ms periodicity.

Figure 11:
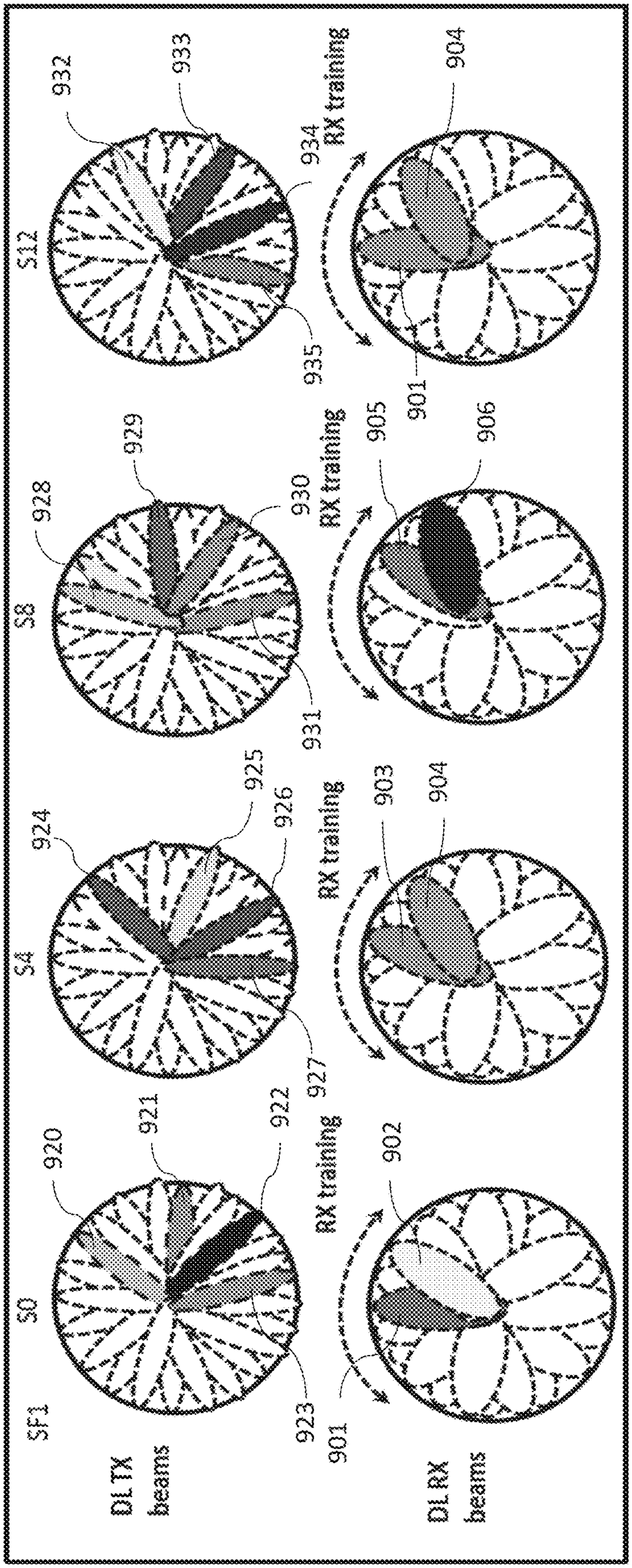
FIG. 11 schematically shows an example of clustering information leveraging at a receiver for its receiver beamformer training.

FIG. 11 shows an example how clustering information with four TX beams can be leveraged at a receiver with two beams. As can be seen, by using clustering information a receiver is enabled to observe multiple copies of transmitted signal arriving nearly from the same direction to the receiver. As a result of this, the receiver has an improved chance to train/adjust its beamformer weights to correspond to intended directions. This Figure shows an example of beam clustered assisted training in sub-frame 1 (SF1). There are 4 TX beam clusters, where different clusters are formed as follows: cluster 1 (with beams referenced 920, 924, 928, 932), cluster 2 (with beams referenced 921, 925, 929, 939), cluster 3 (with beams referenced 922, 926, 930, 934) and cluster 4 (with beams referenced 923, 927, 931, 935). A first beam of each cluster is in symbol S0, a second beam of each cluster is in symbol S4, a third beam of each cluster is in symbol S8, a fourth beam of each cluster is in symbol S12. At RX side, there are 2 RX beams available at the time. Now, UE has received e.g. via the PBCH clustering information, e.g. number of cluster, cluster size, cluster periodicity, antenna port association per cluster. Based on this information, UE is aware of at which symbols beams are belonging to certain clusters. Hence, the UE can leverage this information when it is performing its RX beamformer weight training. For example, at symbol 0 UE achieves with its RX beams 901 and 902 maximum RSRP values. Therefore, by using clustering information, the UE knows at symbols 4,8,12 it can use again "more less the same" RX beams as e.g. for the first symbol S0. Therefore, the UE may save a lot of its computational complexity as well latency associated with training by using clustering information. Thus the beams 903 and 904 used for symbol S4 are similar or the same as used for symbol S0. Similarly for the beams 905 and 906 for symbol S8 and beams 901 and 904 for symbol S12.

Embodiments may be used in co-located and/or non co-located antenna deployments.

Figure 12:
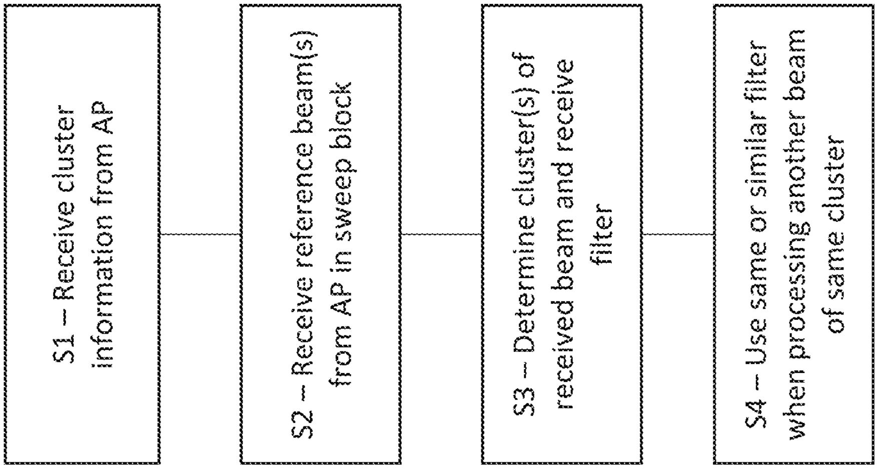
FIG. 12 shows a flowchart of an example method according to some embodiments.

With reference to FIG. 12, there is shown an example of a method according to an embodiment.

In step S1, cluster information is received from the access point. The cluster information may be as discussed previously. It should be appreciated that in other embodiments, the UE may otherwise obtain the cluster information.

In step S2, the UE may receive a reference beam or other beam from the access point. This may be received in a sweep block such as discussed previously.

In step S3, the UE may determine receive processing information, for example a receive filter and/or other receive processing information. The UE may determine which cluster or clusters the received beam is associated.

In step S4, the UE may use the same or similar receive processing information when receiving another beam of the same cluster at least initially to see if that receive processing information is also appropriate for that other beam of the same cluster.

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:

receiving beam cluster information from a beam forming access point, said beam cluster information defining a plurality of beam clusters, said beam cluster information defining beam identification information for each of a plurality of beams in a respective beam cluster;

determining, from said beam cluster information, at least a receive filter associated with at least one beam of at least one beam cluster of said plurality of beam clusters; and using said receive filter to control processing of said at least one beam of said at least one beam cluster received from said access point.

2. The method as claimed in claim 1, comprising control processing of another beam of said beam cluster using said receive filter.

3. The method as claimed in claim 2, wherein determining said receive filter comprises training a receiving beamformer.

4. The method as claimed in claim 3, comprising receiving a plurality of replicas of one or more beams of a cluster, and using said plurality of replicas to train said receiving beamformer.

5. The method as claimed in claim 1, wherein each cluster of beams received from said access point is associated with a set of antenna ports, wherein said receive filter comprises respective antenna port information.

6. The method as claimed in claim 1, comprising receiving a plurality of reference beams from said access point.

7. The method as claimed in claim 6, wherein each reference beam comprises beam identity information.

8. The method as claimed in claim 7, wherein said plurality of reference beams are received in one or more sweep blocks.

9. The method as claimed in claim 1, wherein said cluster information comprises one or more of: clustered downlink beams; association to a set of one or more antenna ports; cluster size; periodicity of cluster; information associated with a next available subframe.

10. The method as claimed in claim 1, comprising performing at least one of the following:

receiving said cluster information in a broadcast channel;

receiving said cluster information in a system information block; and receiving said cluster information one of periodically or aperiodically.

11. The method as claimed in claim 1, wherein said beam clusters are configured dynamically or semi-statically.

12. The method as claimed in claim 1, comprising receiving beam map information from said access point for beams provided by said access point.

13. The method as claimed in claim 12, wherein said beam map information comprises a codebook definition.

14. The method as claimed in claim 1, comprising sending a request to said access point, said request requesting activation of one or more beams.

15. The method as claimed in claim 14, comprising receiving beam map information from said access point for beams provided by said access point, wherein said request to said access point is determined in dependence on beam cluster information and said beam map information.

16. The method as claimed in claim 1, wherein a first beam is received on one symbol of a subframe and at least one other beam of said cluster is received on a different symbol of said subframe.

17. A non-transitory computer-readable storage medium storing instructions that when executed cause a processor to perform the method of claim 1.

18. An apparatus comprising at least one processor, and at least one memory including computer program code, the at least one memory and the computer program code configured to, with the at least one processor, cause the apparatus at least to:

receive beam cluster information from a beam forming access point, said beam cluster information defining a plurality of beam clusters, said beam cluster information defining beam identification information for each of a plurality of beams in a respective beam cluster;

determining, from said beam cluster information, at least a receive filter associated with at least one beam of at least one beam cluster of said plurality of beam clusters; and use said receive filter to control processing of said at least one beam of said at least one beam cluster received from said access point.

* * * * *